United States Patent
Bensch et al.

(10) Patent No.: US 12,145,591 B2
(45) Date of Patent: Nov. 19, 2024

(54) METHOD FOR SLIP CONTROL OF A VEHICLE WHEEL AND DEVICE THEREFOR

(71) Applicant: ZF CV Systems Global GmbH, Bern (CH)

(72) Inventors: Uwe Bensch, Hannover (DE); Thomas Dieckmann, Pattensen (DE); Johannes Heseding, Hannover (DE); Christoph Moritz, Hannover (DE); Gerd Schünemann, Laatzen (DE)

(73) Assignee: ZF CV Systems Global GmbH, Bern (CH)

( * ) Notice: Subject to any disclaimer, the term of this patent is extended or adjusted under 35 U.S.C. 154(b) by 355 days.

(21) Appl. No.: 17/843,766

(22) Filed: Jun. 17, 2022

(65) Prior Publication Data

US 2022/0315004 A1 Oct. 6, 2022

Related U.S. Application Data

(63) Continuation of application No. PCT/EP2020/084047, filed on Dec. 1, 2020.

(30) Foreign Application Priority Data

Dec. 19, 2019 (DE) .................. 10 2019 135 087.5

(51) Int. Cl.
*B60W 30/18* (2012.01)
*B60W 10/08* (2006.01)
*B60W 10/184* (2012.01)

(52) U.S. Cl.
CPC ...... *B60W 30/18172* (2013.01); *B60W 10/08* (2013.01); *B60W 10/184* (2013.01);
(Continued)

(58) Field of Classification Search
CPC .............. B60W 10/08; B60W 10/184; B60W 30/18172; B60W 2520/10;
(Continued)

(56) References Cited

U.S. PATENT DOCUMENTS

2004/0176899 A1 9/2004 Hallowell
2011/0054750 A1 3/2011 Polenz et al.
(Continued)

FOREIGN PATENT DOCUMENTS

CN 104002699 A 8/2014
CN 104828044 A 8/2015
(Continued)

OTHER PUBLICATIONS

English translation and Written Opinion of the International Searching Authority dated Feb. 10, 2021 for international application PCT/EP2020/084047 on which this application is based.
(Continued)

*Primary Examiner* — Edwin A Young
(74) *Attorney, Agent, or Firm* — Walter Ottesen, P.A.

(57) ABSTRACT

The disclosure is directed to a method for slip control of a vehicle wheel driven via an electric drive. The method includes at least the following steps: driving the electric drive of the vehicle wheel using an actual drive torque in a torque control in a torque control step, determining a wheel speed and a wheel slip of the vehicle wheel and evaluating the wheel slip by way of an instability criterion as to whether an instability exists, upon recognizing an instability, direct or indirect transition in a slip control of the wheel slip to a setpoint slip by driving the electric drive, determining whether an end criterion for ending the slip control is satisfied; and, if the end criterion is satisfied, returning to the torque control in the torque control step.

29 Claims, 4 Drawing Sheets

(52) U.S. Cl.
CPC ..... *B60W 2520/10* (2013.01); *B60W 2520/28* (2013.01); *B60W 2710/083* (2013.01); *B60W 2710/18* (2013.01); *B60W 2720/26* (2013.01)

(58) Field of Classification Search
CPC ....... B60W 2520/28; B60W 2710/083; B60W 2710/18; B60W 2720/26
See application file for complete search history.

(56) References Cited

U.S. PATENT DOCUMENTS

| | | | |
|---|---|---|---|
| 2012/0130581 A1 | 5/2012 | Semsey et al. | |
| 2013/0013151 A1 | 1/2013 | Schafiyha et al. | |
| 2013/0041562 A1* | 2/2013 | Mair | B60W 10/02 701/67 |
| 2014/0336856 A1 | 11/2014 | Loos et al. | |
| 2015/0353076 A1 | 12/2015 | Poertner et al. | |
| 2016/0243943 A1 | 8/2016 | Sugai | |
| 2018/0065629 A1* | 3/2018 | Wolff | B60W 30/18009 |

FOREIGN PATENT DOCUMENTS

| | | |
|---|---|---|
| CN | 105682980 A | 6/2016 |
| CN | 106427662 A | 2/2017 |
| DE | 10 2010 003 076 A1 | 8/2011 |
| DE | 10 2011 100 814 A1 | 11/2012 |
| DE | 10 2013 226 894 A1 | 6/2015 |
| DE | 10 2014 210 537 A1 | 12/2015 |
| DE | 10 2014 109 790 A1 | 1/2016 |
| DE | 10 2017 211 436 A1 | 1/2019 |
| EP | 1 849 745 A1 | 10/2007 |
| EP | 2 612 796 B1 | 5/2016 |
| JP | 2018-18697 A | 2/2018 |
| WO | 2008/012454 A1 | 1/2008 |
| WO | 2011/083004 A1 | 7/2011 |

OTHER PUBLICATIONS

English translation and Office action of the Chinese Patent Office dated May 12, 2024 in corresponding Chinese patent application No. 202080084938.X.

International Search Report of the European Patent Office dated Feb. 10, 2021 for international application PCT/EP2020/084047 on which this application is based.

* cited by examiner

METHOD FOR SLIP CONTROL OF A VEHICLE WHEEL AND DEVICE THEREFOR

CROSS REFERENCE TO RELATED APPLICATIONS

This application is a continuation application of international patent application PCT/EP2020/084047, filed Dec. 1, 2020 designating the United States and claiming priority from German application 10 2019 135 087.5, filed Dec. 19, 2019, and the entire content of both applications is incorporated herein by reference.

TECHNICAL FIELD

The disclosure relates to a method and a device for slip control of a vehicle wheel driven via an electric drive.

BACKGROUND

Electrically driven vehicles having an electric drive acting directly on the individual wheels enable an individual activation of the individual vehicle wheels, which is also referred to as wheel drive. Via the electric drive, wheel braking with recuperation or reclamation of the kinetic energy as electrical energy can take place. The electric drive can act directly or through a transmission on the wheel for this purpose. Furthermore, a friction brake is generally provided, which is configured in utility vehicles as a pneumatic brake.

Instabilities can occur in particular if greater longitudinal and lateral forces are to be transmitted in a driving situation than is permitted by the coefficient of friction between tire and road. During a braking action, in general an ABS intervention is carried out on the wheel, in which a locking tendency is recognized, so that locking of the wheel is prevented by suitable activation of the friction brake in consideration of a maximum permissible slip value. The wheel-individual brake force can thus be adapted and the wheel slip can be controlled to a suitable slip value at which a maximum force can be transmitted between wheel and road. The steerability, that is, the transmission of a lateral force, is thus maintained by such a method.

However, problems result in systems having electrical drives acting individually by wheel and supplementary friction brakes. The generator braking torque of the electric drive, that is, the recuperation, can thus result in a locking tendency of the wheel. Upon establishing such a locking tendency, in general the energy reclamation is switched off and the ABS control mechanism acting solely via the friction brake is carried out to ensure the driving stability.

Such switching over between systems is generally complex and is furthermore not energetically optimal. In the ABS control method, the capabilities of the electric drives for rapidly forming positive and negative torques are then not used.

DE 10 2017 211 436 A1 describes a method and a device for activating an electric motor for a vehicle in which a setpoint speed value representing a setpoint speed of the electric motor is changed by a speed step and the torque provided by the electric motor in this way is detected. However, problems in the lateral guidance can thus occur in particular; furthermore, wheel velocities are possibly set in this way which are not adapted to the velocity level.

US 2014/0336856 relates to a device for drive slip control for a vehicle having electromotive vehicle drive, in which the electric drive motors of the wheels are each powered by a controllable inverter, wherein an ASR control unit communicates the maximum permissible speed of the relevant drive motor to each inverter for speed control. Such a control can thus in particular limit a drive slip.

A method for operating a hybrid vehicle having an internal combustion engine and electric machine is described in US 2015/0353076, wherein the electric machine can be operated in a generator operating mode and safety measures can be carried out while increasing or reducing the wheel drive. A mode for keeping constant the sum of the drive torques of both drives is provided in this way.

US 2012/0130581 describes a method and a system for controlling a wheel braking slip for a vehicle having electric drive, in which a braking signal is detected by a slip control unit and thereupon an electric drive control unit and a friction brake control unit are activated. Regenerative braking can thus be carried out in consideration of the wheel slip.

An ABS for a four-wheel electric vehicle having a slip control is described in JP 2018018697 A.

US 2004/0176899 A discloses a controller of the torques exerted on a plurality of wheels of a motor vehicle, wherein speed sensors and a yaw rate acceleration sensor are provided. Inter alia, the required torques to be exerted on the respective wheels are determined on laterally opposing sides of the vehicle for this purpose, to regulate the wheel slip and generate a correction torque around the yaw axis of the vehicle. Furthermore, setpoint values desired by the driver can be taken into consideration for the control.

In EP 1 849 745 B1, a controller for brake forces and drive forces of a vehicle is provided, in which the driver intention is recorded and a setpoint brake/drive force and a setpoint yaw torque are determined, which are to be generated via the brake/drive forces which are to be exerted on the tires. A yaw rate sensor is provided for this purpose.

EP 2 612 796 B1 describes a brake force control unit for a vehicle having an electric force generating mechanism, which can apply an electromagnetic drive force or brake force to a wheel, wherein in addition a brake force generating mechanism for implementing mechanical brake forces is provided. Furthermore, a road surface state detection unit is provided, wherein a locking tendency of the wheels is determined on the basis of the detected data.

Such methods and systems primarily enable in general a longitudinal control of the wheel slip; however, the lateral guidance is generally taken into consideration little or not at all in this case. The methods are also sometimes quite complex or require additional sensors which are not available in every vehicle.

SUMMARY

It is an object of the disclosure to provide a method and a device for slip control of a vehicle wheel driven via an electric drive, which enable secure stabilization of the vehicle with good controllability of the vehicle.

A device according to the disclosure for slip control can be used in particular for carrying out the method according to the disclosure; the method according to the disclosure for slip control can be carried out in particular using the device according to the disclosure.

According to the disclosure, a torque control is therefore carried out via an electric drive acting on the respective vehicle wheel in a torque control step and actual drive torques or forces are introduced, which can have both an accelerating and also a decelerating effect. For this purpose, a wheel slip of the respective vehicle wheel is determined and it is checked whether instability exists. If an instability of the vehicle wheel is established, a slip control of the wheel slip to a setpoint slip of the vehicle wheel is advantageously carried out, or a speed control of the electric drive to this setpoint slip is carried out, since such a slip control or speed control in particular on the one hand enables a high transmission of the longitudinal forces, in particular the longitudinal forces resulting in deceleration, and furthermore ensures a suitable lateral force transmission.

For this purpose, the actual drive torque transmitted from the electric drive to the vehicle wheel, which can be accelerating or braking, is determined and assessed using an end criterion. If the end criterion or ending criterion is met, the superimposed speed control or slip control of the electric drive is ended.

A control without using the friction brake is thus advantageously desired; priority can thus also be given in particular to energy recuperation. The electric drive can thus generate electric energy directly upon exertion of a negative actual drive torque and feed it back to the vehicle or an accumulator.

Before the torque control step, a setpoint drive torque determination step can be provided, in which a setpoint drive torque is determined, in particular as a function of a driver input, and in the torque control step, in the activation of the electric drive of the vehicle wheel, the exerted actual drive torque can be measured and set and/or controlled to the setpoint drive torque. This thus enables suitable determination and setting of the actual-setpoint drive torque.

According to the disclosure, in spite of the recuperation enabled during the braking or regenerative braking, instabilities can be reliably recognized. In particular a determined wheel slip of the respective vehicle wheel can be compared to a limiting slip or a slip threshold, for example, 7%, as an instability criterion for this purpose. The determination of the wheel slip is carried out, for example, in a typical manner by means of speed sensors for determining the current speed with comparison to a reference velocity of the wheel, which can be directly determined as the local velocity of the wheel hub over the ground or taken from an additionally provided ABS or ESC system as a reference velocity or ABS or ESC reference velocity. If the instability criterion is met, the superimposed speed control of the electric drive is thus started and the speed of the electric drive is thus controlled to a setpoint slip, for example, 15%.

The selection of the setpoint slip can be carried out on the basis of one selection criterion or multiple selection criteria; the maximum or high transmission of the longitudinal forces and a suitable transmission of lateral forces is advantageously determined. Supplementary criteria can be taken into consideration for this purpose. A determination can in particular be used from available models for longitudinal force and lateral force transmission of a wheel as a function of the wheel slip, possibly in consideration of further parameters such as slip angle, etcetera.

An advantage according to the disclosure is thus already achieved, of enabling a suitable lateral force transmission during the instability control. The lateral guidance of the vehicle is thus ensured in particular, so that curves are also furthermore enabled. In contrast to the systems mentioned at the outset, maintaining steerability thus preferably has priority over shortening the braking distance; in particular, longitudinal control without consideration of the lateral force transmission also cannot be given priority for this purpose.

In that the ending criterion for ending the superimposed speed control is formed as a function of the determined transmitted actual drive torque, an unstable state thus cannot occur upon the ending of the control. Since a speed control or slip control of the drive takes place during the instability control, the current wheel slip thus cannot be used as the ending criterion, since it is set by the control. Therefore, the ending criterion can preferably be selected as a function of the transmitted actual drive torque. It is recognized in this case that it can be ensured by the comparison of the actual drive torque to a setpoint drive torque that an unstable circumstance is not present upon the ending of the superimposed speed control, but rather the presently current slip value ensures sufficient stability.

According to the disclosure, the longitudinal slip is thus limited to a maximum value and the lateral force and steerability are given priority over the brake force at least in the cases in which this is advantageous.

The limiting slip for assessing the instability is advantageously less than the setpoint slip to be introduced, so that the superimposed speed control is begun at the correct time.

According to the disclosure, actual drive torques can thus be introduced in both directions. Therefore, on the one hand, a locking control during a braking process, and furthermore a drive slip control is possible. The comparisons of the slip values and the actual drive torque to the respective limiting values or comparison values is thus carried out in particular on the basis of the absolute value of the values, that is, without sign.

According to one configuration, more than one limiting slip can be provided. If an instability is initially recognized upon exceeding a lower limiting slip of the wheel slip, a transition can thus take place to a speed control of the vehicle wheel and if an upper limiting slip is exceeded, a transition can take place to the slip control of the vehicle wheel in which the wheel slip is controlled to the setpoint slip, that is, in particular as a superimposed slip control step.

In this way, an improved transition from the torque control or torque regulation of the drive torque to the slip control is enabled, that is, in particular also with speed control of the vehicle wheel provided in between, wherein the speed control thus also represents a wheel velocity control of the vehicle wheel.

If the ending criterion is met, the method can in particular be reset, that is, the step of activating the electric drive of the vehicle wheel according to the actual drive torque control or the subordinate actual drive torque regulation is again carried out.

The currently transmitted or input actual drive torque can in particular be produced by measuring the motor current supplied by an activation circuit; it can generally advantageously be presumed in this case that the motor current provided—for example by rectifiers—is proportional to the supplied or transmitted actual drive torque. It is thus possible to determine the transmitted actual drive torque with little effort, wherein the values required for this purpose are generally already available to the system.

One essential advantage of the method according to the disclosure and the device according to the disclosure is that it is thus possible to ensure a lateral force guidance even without additional sensors, for example, yaw rate sensor or lateral acceleration sensor. A suitable setpoint slip for the superimposed speed control can be set on the basis, for example, of a model for longitudinal force guidance and lateral force guidance, which enables the suitable longitudinal force guidance and lateral force guidance with high accuracy.

The use of a friction brake can be provided secondarily, wherein this, for example, is only provided upon recognition of a required intervention, for example, for implementing a correspondingly high braking torque. Otherwise, a locking protection control or ABS control can primarily be carried out by the method according to the disclosure with activation of the electric drive.

The electric drive can in particular be a wheel hub motor, which thus enables the introduction of a suitable actual drive torque individually by wheel. The electric drive can in principle be provided with or without transmission.

Instead of wheel speed sensors of the ABS, the speed of the electric machine, that is, a provided encoder signal, can also be used. If the electric machine acts via a transmission on the wheel, the respective transmission ratio can be used to calculate the wheel speed.

According to one embodiment of the disclosure, after the initial setting of the setpoint slip in the speed control, the setpoint slip value can be varied around this setpoint value, for example, in incremental steps. The torque control or torque setting subordinate to the speed control of the electric drive can thus measure the torque change of the electric drive resulting therefrom. Thus, for example, the initially provided setpoint slip of, for example, 15%, which is assessed as optimal, can be additively changed in the direction, for example, of higher transmitted torques or wheel forces. An upper slip limit can advantageously be provided in this case to limit this variation, which cannot be exceeded, for example having an upper limiting slip (wheel slip limiting value) of 22%.

BRIEF DESCRIPTION OF THE DRAWINGS

The invention will now be described with reference to the drawings wherein.

DESCRIPTION OF THE PREFERRED EMBODIMENTS

Figure 1:
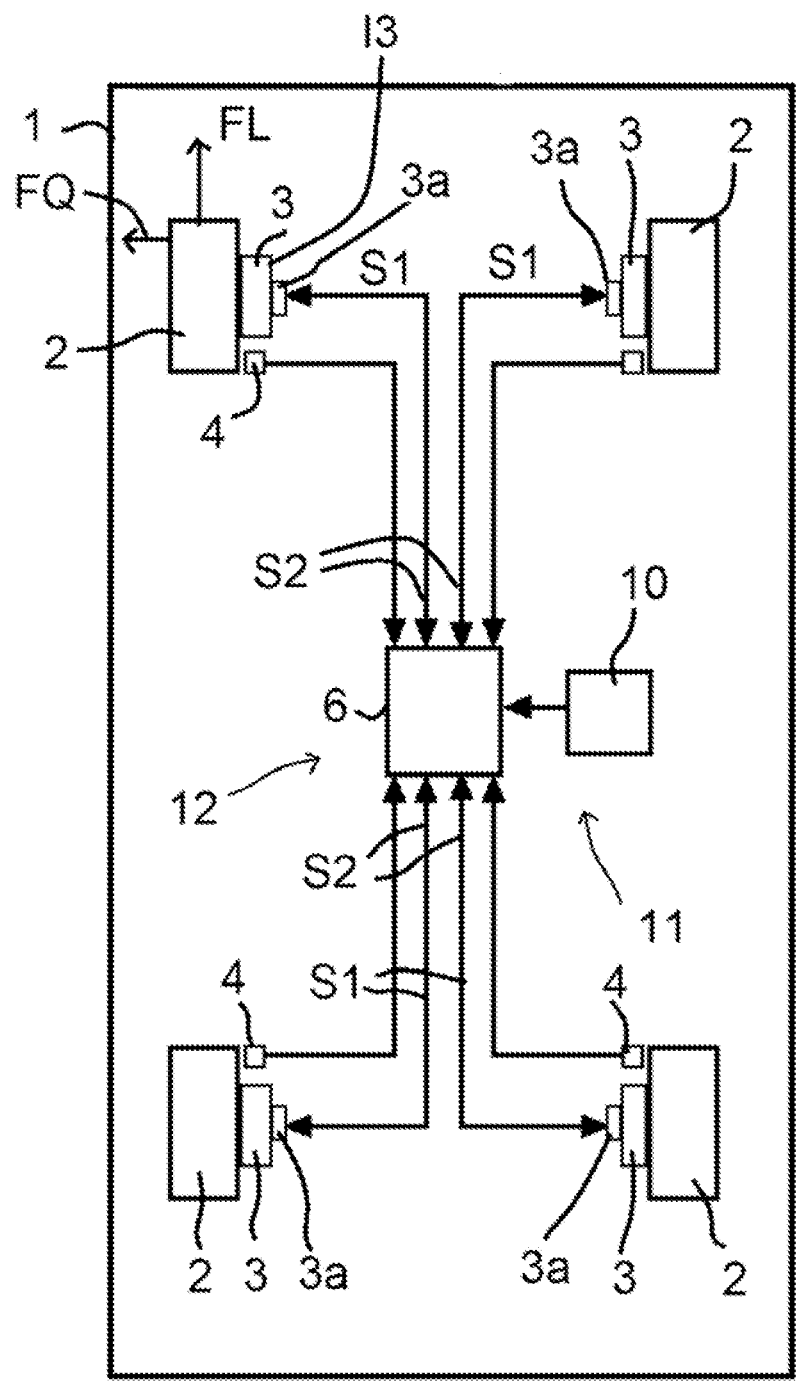
FIG. 1 shows a vehicle having a device or drive controller according to an embodiment of the disclosure.

A vehicle 1 according to FIG. 1 has four wheels 2, which are each driven via an electric wheel hub motor 3. In principle, the respective vehicle wheels 2 can be activated as shown directly via a motor, or also indirectly via a transmission by a motor. The wheel speeds of the individual wheels 2 are each measured via—active or passive—wheel speed sensors 4, which output speed signals n. According to the schematic of FIG. 1, a drive control unit 6 is provided, which activates the individual wheel hub motors 3 via drive control signals S1. The wheel hub motors 3 enable, on the one hand, a drive of the individual vehicle wheels 2 and furthermore a recuperation, that is, a reclamation of the kinetic energy during the braking of the vehicle wheels 2.

The activation device 3a of the wheel hub motor 3 determines the actually outputted actual drive torque M2; it can thus be presumed, for example, that the amperage I3 fed to the wheel hub motor 3 is proportional to the applied actual drive torque M2. Each activation unit 3a thus outputs information signals S2 about the actual drive torque M2 applied to the respective vehicle wheel 2 to the central drive control unit 6. The actual drive torque M2 is positive here if it is used to accelerate the vehicle wheel 2 and negative if it is used to brake the vehicle wheel 2, in particular via recuperation.

Figure 3:
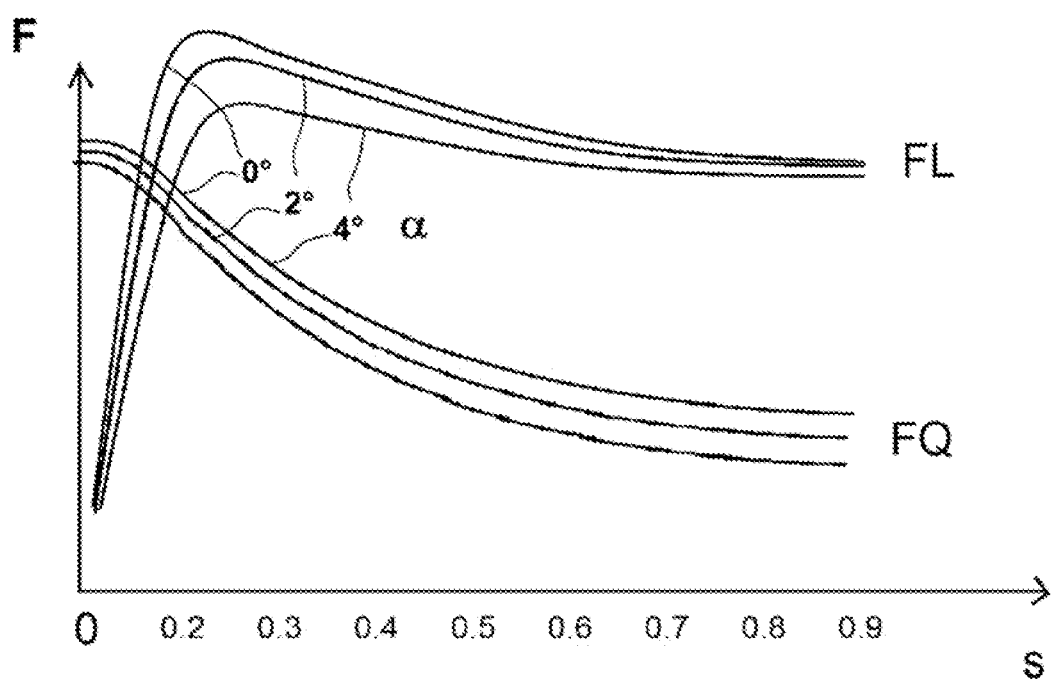
FIG. 3 shows a representation of the tire longitudinal force and tire lateral and transverse force as a function of the wheel slip in various driving situations; and, FIG. 4 shows a flow chart of a method according to the disclosure.

The tire longitudinal force FL transmitted from a vehicle wheel 2 in the longitudinal direction of the vehicle and the tire lateral force FQ transmitted in the transverse direction of the tire 2 are dependent on each wheel slip s and, for example, a slip angle α. The wheel slip s is in turn in particular dependent on the coefficient of friction μ of the road or the underlying surface. FIG. 3 shows a corresponding modelling, according to which the two forces FL and FQ are represented as a function of the wheel slip s and the curves vary with the slip angle α.

The wheel slip s can be determined here as the ratio of the wheel velocity, that is, wheel circumferential velocity v2 in relation to the vehicle velocity v1, since in the case of adhesive friction alone without wheel slip, the wheel velocity (wheel circumferential velocity) v2 corresponds to the vehicle velocity v1 when driving straight ahead.

According to FIG. 3, a certain wheel slip s always occurs upon transmission of a tire longitudinal force FL, so that the curve of FL first rises with increasing wheel slip and—possibly as a function of the slip angle α—subsequently drops with higher value of the wheel slip s, wherein accordingly locking of the vehicle 2 can also occur in particular with higher wheel slip. The tire lateral force FQ decreases with increasing wheel slip s, in contrast.

The above-mentioned considerations are fundamentally to be assumed both during a braking process and also an acceleration process, wherein during the braking process, locking of the braked wheels can occur, and spinning of the wheels can occur during the drive process.

The disclosure seeks to regulate the vehicle wheel 2 via the drive unit, that is, the wheel hub motor 3 here, in a range in which both a tire longitudinal force FL and also a sufficient tire lateral force FQ can be exerted to thus achieve suitable cornering or lateral guidance of the vehicle 1.

During the journey, the drive control unit 6 checks the wheel slip s of the individual vehicle wheels 2 on the basis of the respective wheel speed signals n and a reference velocity v1ref of the vehicle 1 or a reference velocity of the vehicle wheel v2ref, which can be calculated in principle from modelling, as is typical in antilock braking systems (ABS).

An instability can take place, for example, by comparison of the wheel slip s to at least one slip threshold s-thr, that is, using the instability criterion k1: s>s-thr, for example with s-thr=7% or s-thr=0.07.

Upon recognition of an instability according to the instability criterion k1, a speed control of the wheel hub motor 3 to a setpoint slip value s-soll, takes place, for example, s-soll=0.15 (15%), wherein advantageously a transition can be provided here between the starting value of the slip control, that is, for example, using the recognized value of the slip threshold of, for example, s-thr=7%, and the setpoint value to be controlled of, for example, s-soll=0.15 (15%). The precise value of the slip setpoint value s-soll can be selected here according to FIG. 3 as a function of the driving situation; in particular the required tire lateral force FQ can be taken into consideration for this purpose. Therefore, a maximum or high transmission of, for example, the longitudinal force or tire longitudinal force FL resulting in deceleration while maintaining a potential for lateral force transmission is enabled according to the respective driving situation. For this purpose, the drive control unit 6 can in particular also use items of information about cornering, for example, a yaw rate ω or a lateral acceleration aq possibly directly determined by a corresponding sensor. Furthermore, the respective slip angle α can correspondingly be taken into consideration, so that a selection criterion k2 for the setpoint slip s-soll is formed.

Therefore, by activation of the wheel hub motor 3, a speed regulation of the wheel slip s to the setpoint slip s-soll takes place, in that the wheel hub motor is thus activated to accelerate or decelerate the vehicle wheel 2. By measuring the drive current (activation current) I3, the introduced actual drive torque M2 is accordingly currently determined.

Figure 2:
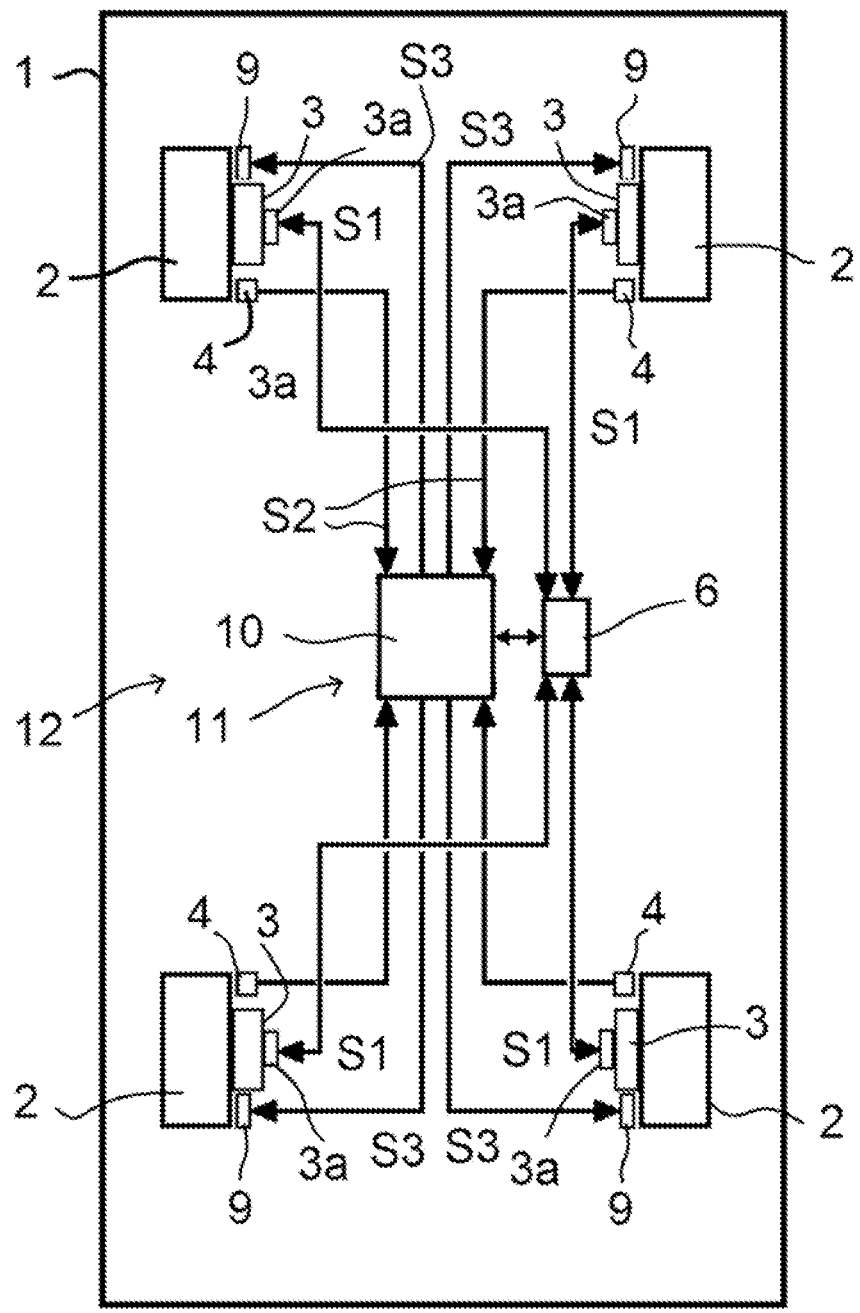
FIG. 2 shows a vehicle having a device according to a further embodiment.

According to FIG. 2, the structure shown in FIG. 1 can accordingly also be produced via the drive control unit 6 and the central brake control unit 10, which activates the respective wheel brakes 9, for example pneumatic wheel brakes for braking individual vehicle wheels 2, directly or, in the case of EBS, in particular also indirectly via brake control signals S3. In particular an electropneumatic valve unit, for example, having relay valves and ABS valves, can be used for the activation, so that the respective wheel brakes 9 then transmit brake forces FB to the individual vehicle wheels 2. In such a structure, the wheel speed sensors 4 thus output the wheel speed signals n to the brake control unit 10 in a typical manner, which has a data connection to the central drive control unit 6, or is integrated therewith.

Therefore, the brake control unit 10 can accordingly also be incorporated in the control, for example, if stronger deceleration of the vehicle wheels 2 is required via the wheel brakes 9 configured as friction brakes. Otherwise, the control according to the disclosure is advantageously carried out solely by activation of the drive unit, that is, the wheel hub motors 3 here.

Figure 4:
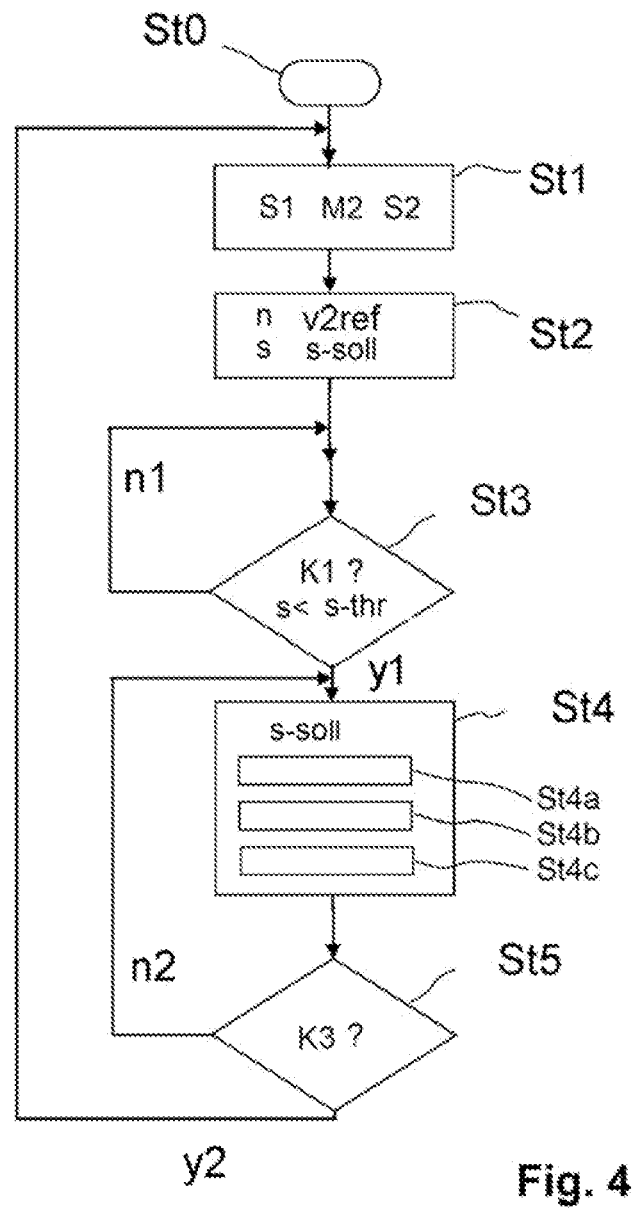

According to the flow chart of FIG. 4, after the start in step St0, in step St1 the setting or control of an actual drive torque M2 thus takes place at the respective vehicle wheel 2 via recuperation.

During and/or after step St1, it is furthermore provided according to step St2 that the wheel speeds n, the wheel slip s, and a reference velocity v2ref are determined, and the setpoint slip s-soll is established or retrieved. According to step St3 it is progressively checked whether the instability criterion K1 is met. Upon the presence of a corresponding instability, according to branch y1, in step St4, the speed control is carried out to control the wheel slip s to the setpoint slip s-soll.

It is progressively checked here according to step St4 whether the transmitted actual drive torque M2 or the transmitted forces meet an end criterion K3 for ending the slip control method.

As the end criterion K3, accordingly the wheel slip can no longer be assessed according to the criterion k1, since this is in particular to be controlled as the controlled variable to the setpoint slip value s-soll. The assessment of the end criterion k3 is therefore carried out via the transmitted actual drive torque M2.

The end criterion k3 is advantageously dependent on the subordinate drive torque regulation or control, to thus assess whether a stable situation exists and the superimposed slip control already does not cause relevant changes.

The end criterion can thus assess in particular whether the requested setpoint torque is less than the transmitted actual drive torque M2, that is, $M2 < x \cdot M\text{-soll}$, wherein in particular $x=1$ can also be assumed, that is, $M2 < M\text{-soll}$.

If this is the case, a stable situation is thus recognized, and according to branch y2, the slip control is ended, that is, according to the illustration of FIG. 3, it is reset back to the subordinate torque control or as shown here it is reset to the control of the actual drive torque M2 according to step St1.

According to further embodiments, in the slip control in step St4, the wheel slip s can be varied in a step St4a around the setpoint value, that is, the slip setpoint value s-soll, in incremental steps. The torque control subordinated by the speed control of the wheel hub motor 3 can in step St4b measure the torque change resulting therefrom of the wheel hub motor 3. The optimum slip point of, for example, 15% is then adaptively changed in step St4c in the direction of higher transmitted torques M2 or wheel forces. It can be provided here that an upper slip limit s-up is not to be exceeded, for example, with s-up=22%, so that the wheel slip s is limited to 22%, which thus represents an adaptation end criterion k5.

In the embodiment according to FIG. 2, the drive control can be combined with an ABS control. The electric deceleration or recuperation can thus be superimposed with a subordinate friction braking at constant torque. If a vehicle wheel 2 has a locking tendency, friction braking via the wheel brake 9 can thus be controlled via an ABS control method via the central brake control unit 10 (ABS control unit) with simultaneous action of the wheel hub motor 3, in particular for recuperation.

According to a further embodiment, an optimum slip velocity can be determined via a constant component of the sliding velocity.

The setpoint slip s-soll can be predetermined by a vehicle dynamics system. The setpoint slip s-soll can thus be modified as a function of the lateral force demand and then limited more strongly if corresponding lateral guidance forces are required. These can be taken from an ESC vehicle movement model.

Furthermore, according to one embodiment, instead of the wheel speed sensors 4 shown, the speed of the wheel hub motor 3, that is, for example, the encoder signal can be used. If the electric drive 3 is input via a transmission on the vehicle wheel 2, the respective transmission ratio is thus used to calculate the wheel speed n.

It is understood that the foregoing description is that of the preferred embodiments of the invention and that various changes and modifications may be made thereto without departing from the spirit and scope of the invention as defined in the appended claims.

LIST OF REFERENCE SIGNS (PART OF THE DESCRIPTION)

1 vehicle
2 vehicle wheel
3 wheel hub motor
3a activation unit of the wheel hub motor 3
4 wheel speed sensor
6 drive control unit
9 wheel brake, in particular pneumatic wheel brake
10 brake control unit
11 electropneumatic EBS brake system having: central brake control unit 10, pneumatic wheel brakes 9, and electropneumatic valves activated via brake control signals S3
12 device made up of the wheel hub motors 3 with activation units 3a and the drive control unit 6
FL tire longitudinal force
FQ tire lateral force
S1 drive control signals
S2 motor torque information signal
S3 brake control signal
n wheel speed signal
s wheel slip s-soll setpoint slip
s-thr limiting slip for assessing the instability
s-thr-lo lower limiting slip
s-thr-up upper limiting slip
s-up upper slip value
k1 instability criterion
k2 selection criterion for determining the setpoint slip value s-soll
k3 end criterion
v1 vehicle velocity
v1ref vehicle reference velocity
v2-soll setpoint velocity of the vehicle wheel 2
v2 wheel velocity
v2ref wheel reference velocity
ω yaw rate
aq lateral acceleration
M2 actual drive torque, transmitted actual drive torque
M-soll setpoint drive torque
SLC slip control
nLC speed control of the vehicle wheel 2
TC torque control, control of the drive torque M as control and/or regulation
VLC vehicle dynamic controller
St0 to St5 steps of the method

What is claimed is:

1. A method for slip control of a vehicle wheel driven via an electric drive, the method comprising the steps of:
   a) driving the electric drive of the vehicle wheel with an actual drive torque (M2) in a torque-control (TC) in a torque control step;
   b) determining a wheel rpm and a wheel slip (s) of the vehicle wheel and evaluating the wheel slip (s) via an instability criterion (K1) as to whether an instability is present;
   c) driving the electric drive when recognizing an instability of a direct or indirect transition into a slip control (SLC) of the wheel slip (s) to a setpoint slip (s-soll) thereby providing a superposed slip control;
   d) determining whether an end criterion (K3) for ending the slip control is satisfied; and,
   e) returning to the torque control (TC) when the end criterion (K3) is satisfied.

2. The method of claim 1, further comprising:
   in advance of method step a), providing a setpoint drive torque determination wherein a setpoint drive torque (M-soll) is determined; and,
   in step a), upon the driving of the electric drive of the vehicle wheel, the applied actual drive torque (M2) is measured and at least one of the following applies:
   i) the applied actual drive torque (M2) is set to the setpoint drive torque (M-soll); and;
   ii) the applied actual drive torque (M2) is controlled to the setpoint drive torque (M-soll).

3. The method of claim 2, wherein said setpoint drive torque (M-soll) is determined as a function of a driver input.

4. The method of claim 1, wherein the torque control (TC) is provided as a subordinate drive torque control for at least one of the following: i) accelerating the vehicle; and, ii) decelerating the vehicle.

5. The method of claim 4, wherein said vehicle is accelerated or decelerated to a setpoint velocity (v2-soll).

6. The method of claim 1, wherein deceleration of the vehicle wheel via the electric drive with recuperation is provided at least temporarily during the slip control (SLC).

7. The method of claim 1, wherein the actual drive torque (M2) applied by the electric drive on the vehicle wheel is determined by measuring a motor current input into the electric drive.

8. The method of claim 1, wherein a wheel hub motor is provided as the electric drive which accelerates the vehicle wheel and/or decelerates the vehicle wheel with recuperation.

9. The method of claim 1, wherein multiple vehicle wheels are each slip controlled via an electric drive; and, the electric drives are driven via a central drive control unit, which outputs drive control signals to set setpoint drive torques (M2-soll) and records motor torque information signals (S2) as to the actual drive torques (M2) introduced on the vehicle wheels.

10. The method of claim 1, wherein the wheel slip (s) of the vehicle wheel is determined from, on the one hand, the determined wheel rpm or a drive speed of a wheel hub motor and, on the other hand, a wheel reference velocity (v2ref) or a vehicle reference velocity (v1ref).

11. The method of claim 1, wherein the setpoint slip (s-soll) is selected on the basis of a force-slip model in consideration of tire lateral forces (FQ) to be transmitted.

12. The method of claim 1, wherein the setpoint slip (s-soll) of the slip control is determined on the basis of a selection criterion (K2).

13. The method of claim 1, wherein the setpoint (s-soll) of the slip control is determined on the basis of a selection criterion (K2) using at least one of the following:
   i) current or intended lateral force (FQ) of the vehicle wheel; and,
   ii) a slip angle (α).

14. The method of claim 1, wherein the setpoint slip (s-soll) is determined and specified by a vehicle dynamics controller (VLC).

15. The method of claim 1, wherein the instability criterion (K1), the wheel slip (s) of the vehicle wheel, is compared to at least one limiting slip (s-thr) and an instability is recognized when the limiting slip (s-thr) is exceeded.

16. The method of claim 15, wherein the limiting slip (s-thr) is less than the setpoint slip (s-soll).

17. The method of claim 15, wherein the limiting slip (s-thr) is less than the setpoint slip (s-soll), with the limiting slip (s-thr) being equal to 7% and the setpoint slip (s-soll) being equal to 15%.

18. The method of claim 15, wherein:
   upon recognition of an instability, a transition takes place to a speed control (nLC) of the vehicle wheel initially upon exceeding a lower limiting slip (s-thr-lo) of the wheel slip (s); and,
   upon exceeding an upper limiting slip (s-thr-lo), a transition to the slip control (SLC) of the vehicle wheel takes place, wherein the wheel slip (s) is controlled to the setpoint slip (s-soll) to provide the superposed slip control.

19. The method of claim 1, wherein, as the end criterion (K3), the actual drive torque (M2) transmitted during the slip control (SLC) is evaluated.

20. The method of claim 19, wherein the actual drive torque (M2) is compared to a setpoint drive torque (M-soll) predetermined in a subordinate torque control (M2<M-soll); and, in a case in which the transmitted actual drive torque (M2) falls below the setpoint drive torque (M-soll) predetermined in the subordinate torque control (TC), the end criterion (K3) is satisfied.

21. The method of claim 1, wherein, in the slip control, an adaptation of the setpoint slip (s-soll) takes place in that:
- after initial setting of the setpoint slip (s-soll), a current setpoint slip (s-soll-ink) is then defined by deviation in incremental steps ($\Delta s$);
- a change of the drive torque (M2) transmitted by the electric drive generated in this way is determined; and,
- if an increase of the transmitted drive torque (M2) is established, the current setpoint slip (s-soll-ink) is defined as a new setpoint slip (s-soll).

22. The method of claim 21, wherein the adaptation of the setpoint slip (s-soll) is ended or limited as a function of a further adaptation end criterion (K5).

23. The method of claim 21, wherein the adaptation of the setpoint slip (s-soll) is ended or limited as a function of a further adaptation end criterion (K5), upon reaching an upper slip limit (s-up) of 22%.

24. The method of claim 1, wherein furthermore a use of wheel brakes is provided simultaneously.

25. The method of claim 24, wherein said wheel brakes are friction brakes.

26. The method of claim 1, wherein at least one of the following applies:
- i) wheel rpm signals are determined by respective wheel speed sensors; and,
- ii) a motor speed (n3) of the electric drive is determined.

27. The method of claim 26, wherein the electric drive is a wheel hub motor.

28. A device for slip control of a vehicle wheel, the device comprising:
- an electric drive for transmitting accelerating and decelerating actual drive torques (M2) to the vehicle wheel;
- a drive unit, provided as part of the electric drive or additionally, for providing current to the electric drive;
- a central drive control unit for driving the drive unit via drive control signals (S1) and for recording motor torque information signals (S2) via the actual drive torque (M2) currently introduced by the drive unit; and,
- the central drive control unit being configured to carry out a method including the steps of:
- a) driving the electric drive of the vehicle wheel with the actual drive torque (M2) in a torque control (TC) in a torque control step;
- b) determining a wheel rpm and a wheel slip (s) of the vehicle wheel and evaluating the wheel slip (s) via an instability criterion (K1) as to whether an instability is present;
- c) driving the electric drive when recognizing an instability of a direct or indirect transition into a slip control (SLC) of the wheel slip (s) to a setpoint slip (s-soll) thereby providing a superposed slip control;
- d) determining whether an end criterion (K3) for ending the slip control is satisfied; and,
- e) returning to the torque control (TC) when the end criterion (K3) is satisfied.

29. A vehicle having the device as claimed in claim 28 and having at least one vehicle wheel driven by the device.

* * * * *